United States Patent [19]

Niggemann

[11] 4,258,894
[45] Mar. 31, 1981

[54] REAR-VIEW MIRROR FOR AUTOMOTIVE VEHICLES

[75] Inventor: Fritz Niggemann, Essen, Fed. Rep. of Germany

[73] Assignee: Busch & Muller, Fed. Rep. of Germany

[21] Appl. No.: 3,938

[22] Filed: Jan. 16, 1979

[30] Foreign Application Priority Data

Jul. 18, 1978 [DE] Fed. Rep. of Germany ....... MR 523
Sep. 19, 1978 [DE] Fed. Rep. of Germany ....... 2840659

[51] Int. Cl.³ .............................................. A47G 1/24
[52] U.S. Cl. .................................. 248/483; 248/288.3
[58] Field of Search ........... 248/478, 479, 480, 288 A, 248/483, 487, 476, 481, 484; 350/288

[56] References Cited

U.S. PATENT DOCUMENTS

| 970,636 | 9/1910 | Miller | 248/481 X |
| 2,137,286 | 11/1938 | Herbig | 248/479 X |
| 2,333,671 | 11/1943 | Peters et al. | 248/481 |
| 2,452,316 | 10/1948 | Morley | 248/483 |
| 2,726,575 | 12/1955 | Koonter | 248/483 |
| 2,732,764 | 1/1956 | Parks | 248/481 UX |
| 3,391,895 | 7/1968 | Bausch et al. | 248/481 X |
| 3,565,033 | 2/1971 | Helle | 248/481 X |
| 3,599,927 | 8/1971 | Talbot | 248/484 |

FOREIGN PATENT DOCUMENTS

| 989378 | 5/1976 | Canada | 248/476 |
| 2212756 | 9/1973 | Fed. Rep. of Germany | 248/484 |
| 2311689 | 12/1976 | France | 248/483 |
| 2322764 | 4/1977 | France | 248/481 |
| 768637 | 2/1957 | United Kingdom | 248/481 |
| 871881 | 7/1961 | United Kingdom | 248/476 |

*Primary Examiner*—J. Franklin Foss
*Attorney, Agent, or Firm*—Jacobs & Jacobs

[57] ABSTRACT

Rear-view mirror for vehicles, particularly motorcycles, comprising a mounting arm on the vehicle or suitable part thereof fastened for turning movement, a mirror housing on the free end of the arm and turnable with respect thereto and a mirror holder adjustably secured in the housing and provided with a mirror glass, the mirror glass holder being turnable around the central axis of the housing. The arrangement is simple and accurate as compared to prior constructions.

2 Claims, 3 Drawing Figures

REAR-VIEW MIRROR FOR AUTOMOTIVE VEHICLES

The present invention relates to a rear-view mirror for automotive vehicles, particularly motorcycles and the like, consisting of a mounting arm on the vehicle, which arm can be fastened in particular for turning motion, a mirror housing provided on the free end of the said arm, particularly in such a manner that it can turn, as well as a mirror holder fastened adjustably on said housing and provided with mirror glass, the mirror-glass holder being turnable around the central axis of the housing.

Such known mirrors have a bent mounting arm which is provided with a thread on both ends and which can be screwed in suitable manner at one end the mirror housing, for instance eccentrically, and at the other end to the handlebar or the like. The mirror housing has on one side a circular opening into which the mirror-glass holder and mirror glass are inserted. Centrally on the rear of the mirror-glass holder there is arranged a ball joint having a central threaded borehole into which there is threaded a screw which extends rearward through the mirror housing. In this way the mirror-glass holder is attached to the housing.

For the rough adjustment of the completely assembled mirror it can be swung around the point of attachment to the vehicle of the mounting arm or the mirror can be swung around the upper point of attachment of the mounting arm.

The fine adjustment is effected by swinging the mirror-glass holder together with the mirror glass around the ball joint. Since the ball joint, however, must be very sluggish in action so that the mirror does not move by itself due to vibrations, the adjustment is rather difficult and is effected by intermittent motions. In practice, the mirror-glass holder must be swung several times in opposite directions with respect to the completely correct position in order then to be able to happen to reach the desired position. The adjustment is very difficult also particularly for motorcycle riders who are wearing gloves.

The object of the present invention is to improve a rear-view mirror of the kind described above so that the adjustment thereof is as simple and as accurate as possible.

In order to achieve this purpose the invention proposes that the mirror-glass holder and the mirror glass be mounted exclusively for rotating motion and that the line normal to the mirror glass form with the central axis of the housing an invariable angle which is in particular greater than 5°, and particularly 11°.

In principle the invention resides in the fact that the mirror glass together with its holder carries out a positively controlled tumbling movement upon turning in the mirror housing. In this way after the rough adjustment of the mirror the fine adjustment thereof is facilitated since only one degree of freedom is provided for the displacement motion.

The structurally predetermined angular displacement is so designed that the fine adjustment is sufficient for drivers of different height. An adjustment angle of 11° has proven particularly favorable, but deviations herefrom are possible. They appear meaningful only within a range of 5° to 25°.

One particular embodiment of the invention resides in the fact that the mirror-glass holder is fastened to a bolt which is arranged coaxial to the central axis of the mirror housing, is fastened to the mirror housing and serves as axis of rotation for the mirror-glass holder, the mirror-glass holder and the mirror housing having guide surfaces extending at right angles to the bolt and corresponding to each other and the mirror glass being inclined at an angle of in particular about 11° to said surface, the central axis of the mirror and the central axis of the bolt furthermore intersecting.

In order to make rotation possible guide surfaces are, of course, circular. The shape of the mirror housing and of the mirror holder can be selected independently thereof.

The relatively large guide surfaces which can take up practically the entire cross section of the housing parts at the surface of contact permit a relatively precise adjustment of the displacement force the surfaces being pretensioned by tightening the central bolt which is developed as fastening screw. The head of the fastening bolt can emerge towards the rear through the mirror housing and be actuatable in this manner.

One preferred solution of the above-indicated problem is obtained by developing the mirror housing and the mirror-glass holder as hollow bodies, the mirror housing being open on one side and having developed thereon a peripheral circularly closed outwardly projecting collar over which the mirror-glass holder can snap by means of a correspondingly developed groove, it being thus turnable around its central axis at least with static friction.

One prerequisite for the mounting of this embodiment is that the housing parts which are adapted to be inserted one into the other permit a slight elastic deformation upon the snapping action.

A sufficient pretensioning of the parts with respect to each other can be obtained by suitable dimensioning and selection of the material. In this way assurance is provided that the mirror-glass holder will retain the position which has once been selected and can be displaced only manually.

The shape claimed is also favorable from the standpoint of manufacture.

In order to make unintentional further displacement difficult, the guide surfaces of mirror housing and mirror-glass holder which correspond to each other may be held together by detent means.

This can be done in the embodiment according to claim 3 by knurling the collar and the groove on cooperating surfaces. In the case of the variant according to claim 2, a knurling can be provided on the flat guide surfaces.

The mirror housing and the mirror-glass holder preferably consist of plastic.

With this material the desired elasticity can be obtained particularly easily.

In known manner it is intended that the mirror glass can be cemented onto the mirror-glass holder.

One preferred embodiment of the invention is shown in the drawing and will be described in further detail below. In the drawing.

Figure 1:
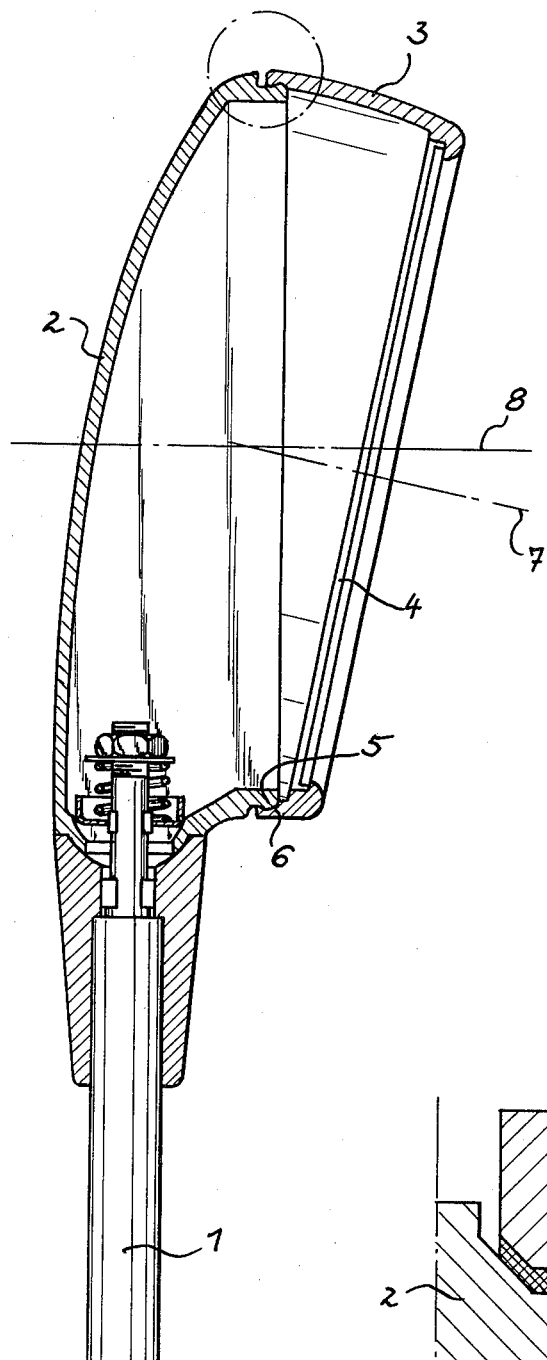
FIG. 1 is a cross sectional view through a rear-view mirror.

The rear-view mirror for motorcycles consists of a mounting arm 1 (shown only in part) which can be fastened for rotation to the vehicle, a mirror housing 2 which is held for rotation on the free end of said arm and a mirror-glass holder 3 together with mirror glass 4 which is fastened to said housing.

The mirror-glass holder 3 is merely rotatable with respect to the housing 2 and not swingable.

The mirror housing 2 is developed as a hollow shell open towards the mirror-glass holder 3. At this place it has a collar 5 surrounding it in the form of a circle. The mirror-glass holder 3 is also open on one side and for assembly has its circular opening facing the circular opening of the housing 2. On its edge there is developed a circumferential groove 6 into which the collar 5 can be inserted with elastic deformation of the edge of the housing and/or of the edge of the glass holder. The parts are then connected to each other by frictional force.

The mirror-glass holder 3 can be easily turned relative to the housing 2 but is held, however, sufficiently secure. The mirror glass 4 which is cemented into the holder 3, is so arranged that the line 7 normal to it intersects the central axis 8 of the housing 2 which is at the same time the axis of rotation.

The angle of intersection is 11°.

Figure 3:
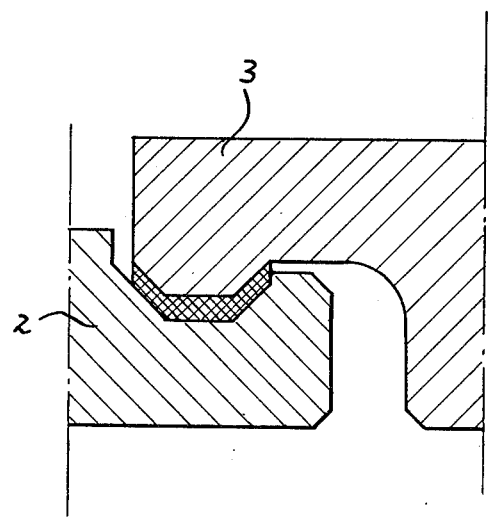
FIG. 3 shows a detail on a larger scale.
Figure 2:
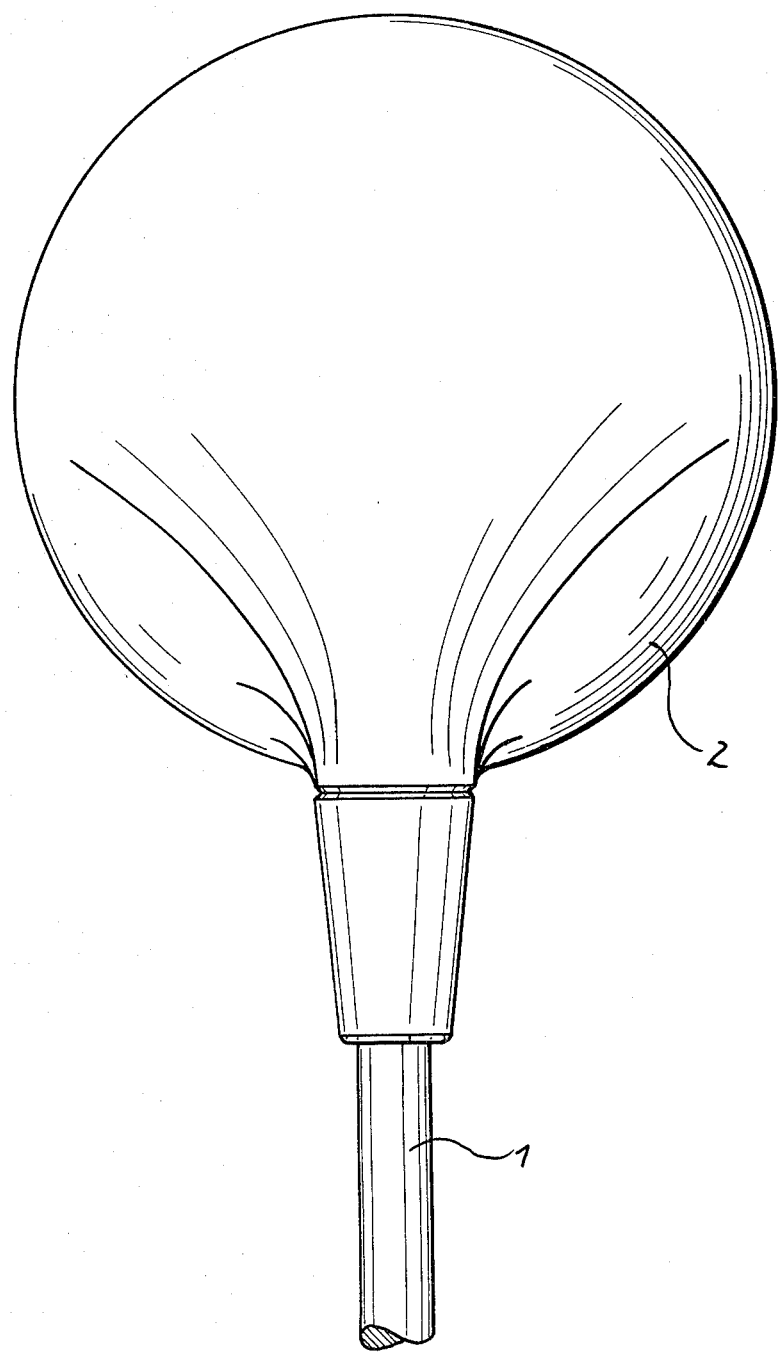
FIG. 2 is a rear view thereof.

For particularly good securing in position, the groove 6 and the collar 5 are provided with a knurling, as can be noted from FIG. 3.

The invention is not limited to the illustrative embodiment shown but may be varied within the scope of the claims.

All new individual features and combined features disclosed in the specification and/or drawing are considered to be essential to the invention.

What is claimed is:

1. A rear-view mirror for motorcycles and other automotive vehicles consisting of a rod-like mounting arm adapted to be rotationally secured to a vehicle, a fitting fixed on the free end of the mounting arm and having a concave upper surface with an annular shoulder for the reception of an annular shoulder of the mirror housing, a bolt of reduced cross-section as compared with the mounting arm extending centrally through the concave surface and provided on its upper end with a cupshaped member for the reception of an encircling helical spring acting resiliently against a limiting stop nut-and-washer assembly screwed on the exteriorly threaded upper extremity of the bolt, a mirror housing formed as a hollow shell open toward a mirror-glass holder and said housing and holder being held together, and a mirror glass secured in a groove of the holder, the housing having an annular surface bounded by a shoulder resting on the annular shoulder of the fitting and on which annular surface the holder rearward upper portion rests and the lower portion of the holder has a circumferential groove for the reception of a convex collar formed in the housing, the housing having its edge toward the holder inclined relative to the holder so that the inclination has a central horizontal axis intersecting the normal line of the mirror at an acute angle not less than 5° and not more than 25° and the mirror-glass holder being rotatable around the central axis of the housing which constitutes the only axis of rotation.

2. A rear-view mirror according to claim 1 wherein the housing and holder are composed of plastic material frictionally held together and the angle of intersection is 11°.

* * * * *